(12) United States Patent
Lee et al.

(10) Patent No.: US 9,247,577 B2
(45) Date of Patent: Jan. 26, 2016

(54) METHOD FOR TRANSMITTING/RECEIVING MESSAGE FOR RECEIVING BROADCASTING SERVICE RECEPTION IN WIRELESS COMMUNICATION SYSTEM AND APPARATUS FOR SAME

(75) Inventors: Youngdae Lee, Anyang-si (KR);
Sunghoon Jung, Anyang-si (KR);
Seungjune Yi, Anyang-si (KR);
Sungduck Chun, Anyang-si (KR);
Sungjun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 13/979,720

(22) PCT Filed: Mar. 30, 2012

(86) PCT No.: PCT/KR2012/002363
§ 371 (c)(1),
(2), (4) Date: Jul. 15, 2013

(87) PCT Pub. No.: WO2012/134213
PCT Pub. Date: Oct. 4, 2013

(65) Prior Publication Data
US 2013/0294325 A1 Nov. 7, 2013

Related U.S. Application Data

(60) Provisional application No. 61/469,826, filed on Mar. 31, 2011.

(51) Int. Cl.
*H04H 20/71* (2008.01)
*H04W 76/04* (2009.01)
*H04W 4/06* (2009.01)

(52) U.S. Cl.
CPC ............... *H04W 76/04* (2013.01); *H04W 4/06* (2013.01)

(58) Field of Classification Search
None
See application file for complete search history.

(56) References Cited

U.S. PATENT DOCUMENTS

| 2005/0083913 | A1* | 4/2005 | Choi et al. ................... 370/352 |
| 2007/0206530 | A1* | 9/2007 | Lee et al. ..................... 370/329 |
| 2008/0031245 | A1* | 2/2008 | Pekonen ....................... 370/390 |
| 2008/0043658 | A1* | 2/2008 | Worrall ........................ 370/312 |
| 2010/0080159 | A1* | 4/2010 | Hu et al. ....................... 370/312 |
| 2010/0110879 | A1  | 5/2010 | Kim et al. |
| 2010/0216454 | A1* | 8/2010 | Ishida et al. ................. 455/424 |
| 2012/0002650 | A1* | 1/2012 | Yanagisako ................. 370/338 |
| 2014/0105139 | A1* | 4/2014 | Tomici et al. ................ 370/329 |
| 2014/0348050 | A1* | 11/2014 | Kim et al. .................... 370/312 |
| 2014/0362759 | A1* | 12/2014 | Lu et al. ....................... 370/312 |

FOREIGN PATENT DOCUMENTS

| WO | WO 2008/022856 A1 | 2/2008 |
| WO | WO 2009/022822 A2 | 2/2009 |
| WO | WO 2009/022837 A1 | 2/2009 |

* cited by examiner

*Primary Examiner* — Phirin Sam
(74) *Attorney, Agent, or Firm* — Birch, Stewart, Kolasch & Birch, LLP

(57) ABSTRACT

In the present invention, a method for a user equipment transmitting/receiving a message with a network in a wireless communication system is disclosed. More particularly, the method comprises the following steps: transmitting to the network a connection request message including a first indicator; receiving from the network a connection setting message including a second indicator, as a reply to the connection request message; receiving the connection setting message and then transmitting to the network a broadcast-related message; and transmitting the broadcast-related message and then disconnecting with the network based on the second indicator.

8 Claims, 10 Drawing Sheets

-- Prior Art --

FIG. 3
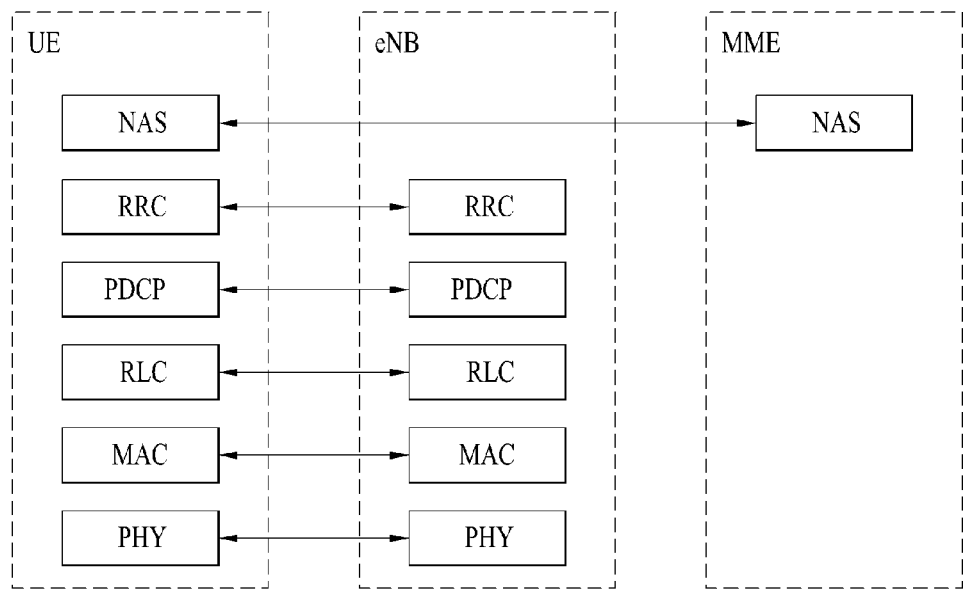
(a) Control-plane protocol stack
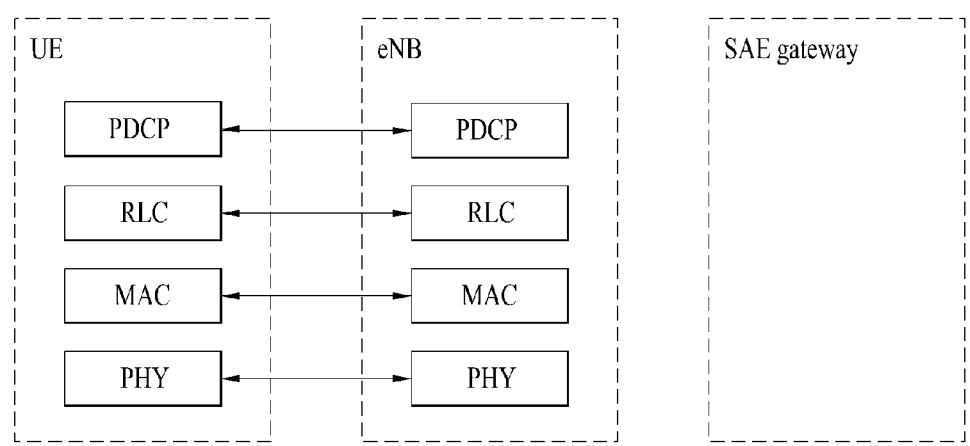
(b) User-plane protocol stack

METHOD FOR TRANSMITTING/RECEIVING MESSAGE FOR RECEIVING BROADCASTING SERVICE RECEPTION IN WIRELESS COMMUNICATION SYSTEM AND APPARATUS FOR SAME

CROSS REFERENCE TO RELATED APPLICATIONS:

This application is the National Phase of PCT/KR2012/002363 filed on Mar. 30, 2012, which claims priority under 35 U.S.C. 119(e) to U.S. Provisional Application Nos. 61/469,826 filed on Mar. 31, 2011, all of which are hereby expressly incorporated by reference into the present application.

TECHNICAL FIELD

The present invention relates to a wireless communication system, and more particularly, to a method of transceiving a message for a broadcast service reception in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110*a* and 110*b* and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Problem

Based on the above-mentioned discussion, a method of transceiving a message for a broadcast service reception in a wireless communication system and apparatus therefor shall be proposed in the following description.

Technical Solution

To achieve these and other advantages and in accordance with the purpose of the present invention, as embodied and broadly described, a method of transceiving a message, which is transceived with a network by a user equipment in a wireless communication system, according to one embodiment of the present invention may include the steps of sending a connection request message including a $1^{st}$ indicator to the network, receiving a connection setup message including a $2^{nd}$ indicator in response to the connection request message, sending a broadcast related message to the network after receiving the connection setup message, and releasing a connection to the network based on the $2^{nd}$ indicator after sending the broadcast related message.

Preferably, the method may further include the step of receiving a counting request message from the network before sending the connection request message. More preferably, the counting request message may be received via MCCH (multicast control channel) or system information. More preferably, the broadcast related message may include a connection setup complete message including a $3^{rd}$ indicator.

In this case, the counting request message may include an information on at least one service and the $3^{rd}$ indicator may indicate a specific service, which is received or intended to be received by the user equipment, among the at least one service.

Moreover, the connection setup complete message including the $3^{rd}$ indicator may be sent in a counting response to the counting request message.

More preferably, the $1^{st}$ indicator may include a connection cause of the connection request message. In this case, the connection cause may include MBMS (multimedia broadcast multicast service) counting. Preferably, the $2^{nd}$ indicator may include a temporary connection indicator.

To further achieve these and other advantages and in accordance with the purpose of the present invention, as embodied and broadly described, a method of transceiving a message, which is transceived by a network with a user equipment in a wireless communication system, according to another embodiment of the present invention may include the steps of receiving a connection request message including a $1^{st}$ indicator from the user equipment, sending a connection setup message including a $2^{nd}$ indicator to the user equipment in response to the connection request message, and receiving a broadcast related message from the user equipment after sending the connection setup message, wherein the $2^{nd}$ indicator is used for the user equipment to release a connection to the network.

Advantageous Effects

According to an embodiment of the present invention, a network can provide an effective MBMS to a user equipment.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 3 is a diagram of structures of control and user planes of a radio interface protocol between a user equipment and E-UTRAN based on 3GPP radio access network specification.

BEST MODE FOR INVENTION

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 1:
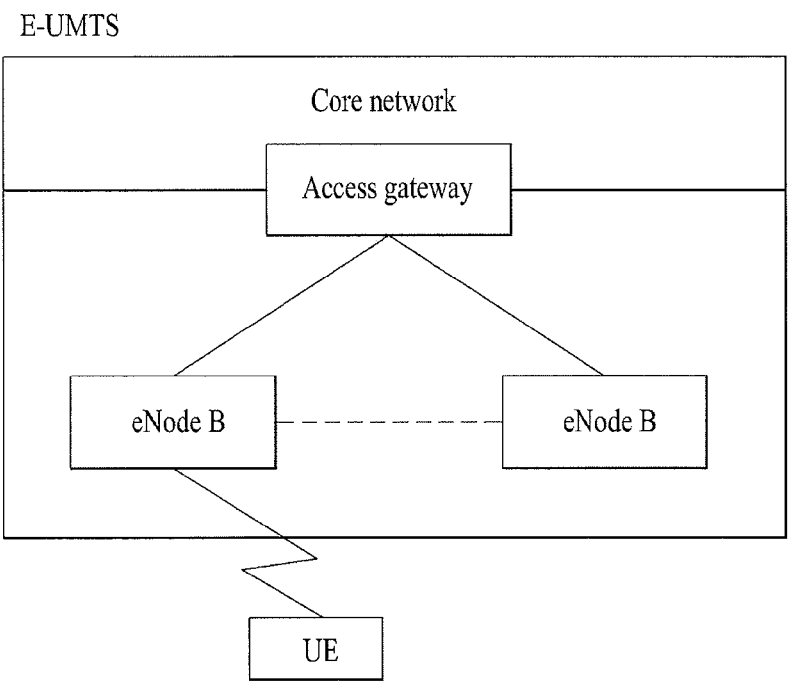
FIG. 1 is a schematic diagram of E-UMTS network structure as an example of a mobile communication system.
Figure 2:
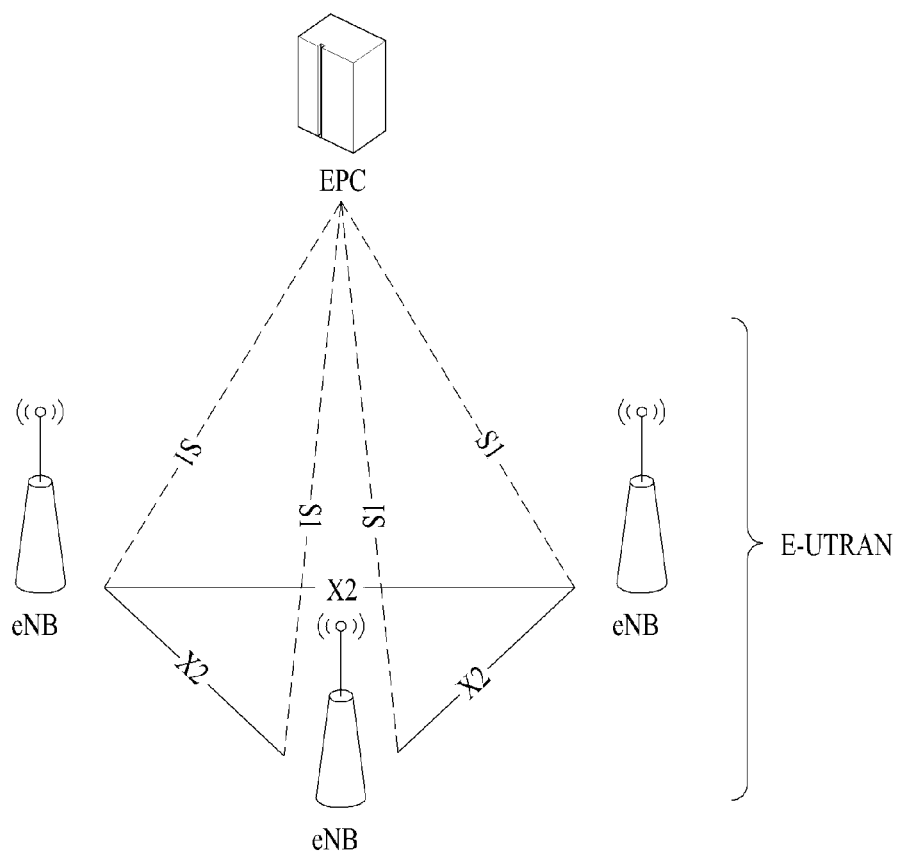
FIG. 2 is a conceptional diagram of a network structure of E-UTRAN (evolved universal terrestrial radio access network).

FIG. 2 is a conceptional diagram of a network structure of E-UTRAN (evolved universal terrestrial radio access network). In particular, the E-UTRAN system is the system evolved from a conventional UTRAN system. The E-UTRAN includes cells (e.g., eNBs). And, the cells are connected via an X2 interface with each other Each of the cell is connected to a user equipment via a radio interface and is also connected to an evolved packet core (EPC) via an S1 interface.

The EPC includes MME (Mobility Management Entity), S-GW (Serving-Gateway) and PDN-GW (Packet Data Network-Gateway). The MME has an information of a user equipment or an information on capability of the user equipment. Such information is mainly used for management of mobility of the user equipment. The S-GW is a gateway having the E-UTRAN as a terminal end point. And, the PDN-GW is a gateway having a packet data network (PDN) as a terminal end point.

FIG. 3 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. To this end, the RRC layer of the user equipment exchanges RRC messages with the RRC layer of the network.

A single cell constructing a base station (eNB) is configured to have one of bandwidths including 1.25 MHz, 2.5 MHz, 5 MHz, 10 MHz, 15 MHz, 20 MHz and the like and provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH).

Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 4:
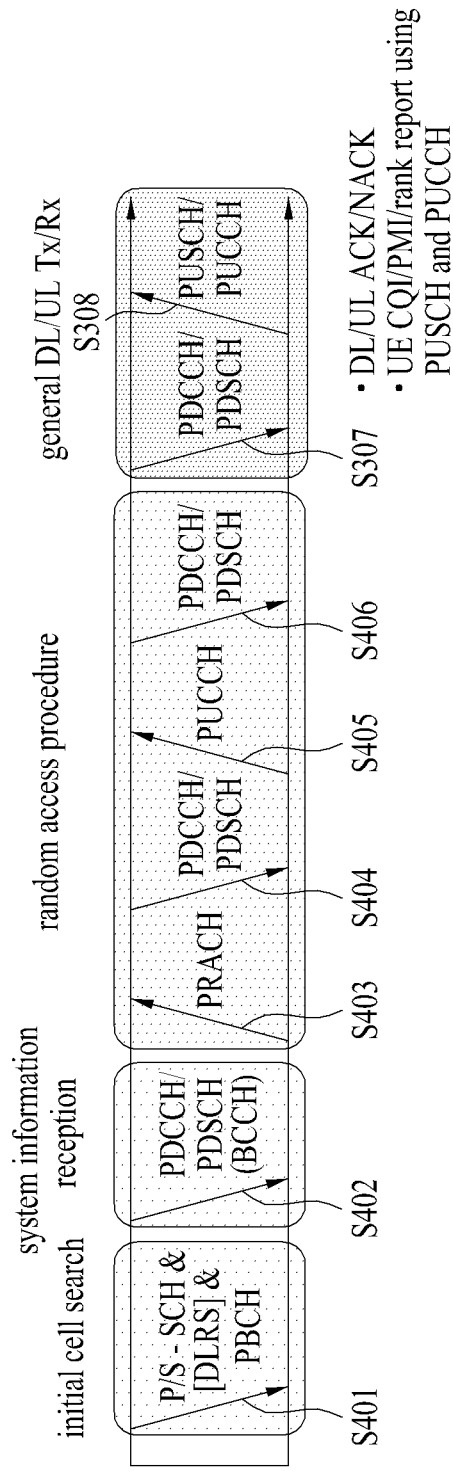
FIG. 4 is a diagram for explaining physical channels used for 3GPP system and a general method of transmitting a signal using the same.

FIG. 4 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S401]. To this end, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S402].

Meanwhile, if the user equipment initially accesses the base station or fails to have a radio resource for signal transmission, the user equipment is able to perform a random access procedure (RACH) on the base station [S403 to S406]. For this, the user equipment transmits a specific sequence as a preamble via a physical random access channel (PRACH) [S403] and is then able to receive a response message via PDCCH and a corresponding PDSCH in response to the preamble [S404]. In case of contention based RACH, it is able to perform a contention resolution procedure in addition.

Having performed the above mentioned procedures, the user equipment is able to perform PDCCH/PDSCH reception [S407] and PUSCH/PUCCH (physical uplink shared channel/physical uplink control channel) transmission [S408] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 5:
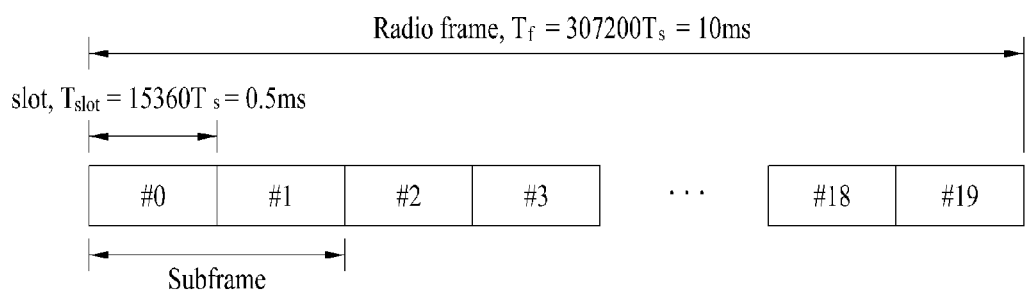
FIG. 5 is a diagram for an example of a structure of a radio frame used for LTE system.

FIG. 5 is a diagram for an example of a structure of a radio frame used by LTE system.

Referring to FIG. 5, a radio frame has a length of 10 ms ($327200 \times T_s$) and is constructed with 10 subframes in equal size. Each of the subframes has a length of 1 ms and is constructed with two slots. Each of the slots has a length of 0.5 ms ($15360 \times T_s$). In this case, $T_s$ indicates a sampling time and is expressed as $T_s=1/(15 \text{ kHz} \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

In the following description, an RRC state of a user equipment and a corresponding RRC connecting method are explained. In this case, the RRC state means whether an RRC of a user equipment is logically connected to an RRC of E-UTRAN (i.e., logical connection). If the RRCs are connected to each other, it is called an RRC connected state (RRC_CONNECTED). If the RRCs are not connected to each other, it can be called an RRC idle state (RRC_IDLE).

Since E-UTRAN is able to obtain an existence of a user equipment in an RRC connected state by a cell unit, it is able to effectively control the user equipment. On the contrary, the E-UTRAN is unable to obtain a user equipment in an idle state by a cell unit and the corresponding user equipment is managed by a CN by a TA unit that is an area unit greater than a cell. In particular, in order to receive such a service as voice and data from a cell, a user equipment in an RRC idle state should make a transition to an RRC connected state.

Particularly, when a user initially turns on a power of a user equipment, the user equipment searches for an appropriate cell and then stays in an RRC idle state at the corresponding cell. If the user equipment staying in the RRC idle state needs to establish an RRC connection, it makes a transition to an RRC connected state by performing an RRC connection establishment process. In particular, if the RRC connection needs to be established, it may mean the case that an uplink data transmission is necessary due to user's call attempt or the like or the case that a response message needs to be sent in case of receiving a paging message from the E-UTRAN.

Figure 6:
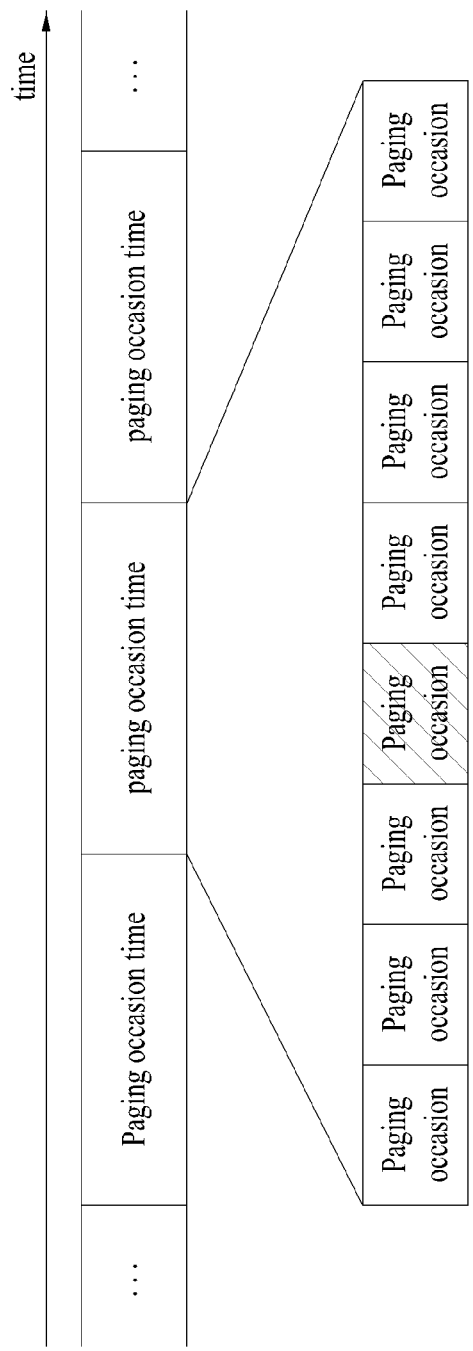
FIG. 6 is a diagram for explaining a general transceiving method using a paging message.

FIG. 6 is a diagram for explaining a general transceiving method using a paging message.

Referring to FIG. 6, a paging message contains a paging cause and a paging record including a UE identity and the like. When the paging message is received, a user equipment is able to perform a discontinuous reception (DRX) for the purpose of power consumption reduction.

In particular, a network configures several paging occasions (POs) for each time cycle called a paging DRX cycle to enable a specific user equipment to obtain a paging message by receiving a specific paging occasion only. The user equipment does not receive a paging channel in a time except the specific paging occasion and is able to stay in a sleep mode to reduce power consumption. And, one paging occasion corresponds to one TTI.

A base station and a user equipment use a paging indicator (PI) as a specific value indicating a transmission of a paging message. The base station defines a specific identity (e.g., paging-radio network temporary identity: P-RNTI) for a usage of the PI and is then able to inform the user equipment of the paging information transmission. For instance, a user equipment wakes up each DRX cycle and then receives one subframe to recognize a presence or non-presence of a paging message. If P-RNTI is contained in L1/L2 control channel (PDCCH) of the received subframe, the user equipment is able to recognize that the paging message exists in PDSCH of the corresponding subframe. If a UE identity (e.g., IMSI) of the user equipment is contained in the paging message, the user equipment makes a response (e.g., RRC connection, system information reception, etc.) to the base station and is then able to receive a service.

In the following description, system information is explained. First of all, the system information should contain necessary information a user equipment should be aware of to access a base station. Therefore, the user equipment should receive all system information before accessing the base station and should have latest system information all the time. Since all user equipments in a cell should be aware of the system information, the base station periodically transmits the system information.

System information can be divided into MIB (Master Information Block), SB (Scheduling Block) and SIB (System Information Block). The MIB enables a user equipment to recognize such a physical configuration of a corresponding cell as a bandwidth and the like. The SB indicates such transmission information of SIBs as a transmission cycle and the like. In this case, the SIB is an aggregate of system informations related to each other. For instance, a specific SIB contains information of a neighbor cell only and another SIB just contains information of a UL radio channel used by a user equipment.

In the following description, MBMS (multimedia broadcast multicast service) is explained. First of all, MBMS (multimedia broadcast multicast service) is a kind of a broadcast/multicast service and is the service for transmitting multimedia data packets to a plurality of user equipments simultaneously. 'Broadcast/multicast service' or /MBMS' used in the present disclosure can be substituted with such a terminology as 'point-to-multipoint service', 'MBS (multicast and broadcast service)' and the like. In the MBMS based on IP multicast, user equipments share a resource required for data packet transmission with each other and then receive the same multimedia data. Hence, in case that user equipments on a predetermined level using MBMS exist in the same cell, it is able to raise resource efficiency. Since the MBMS has no relation with an RRC connected state, a user equipment in an idle state is able to receive the corresponding service.

Figure 7:
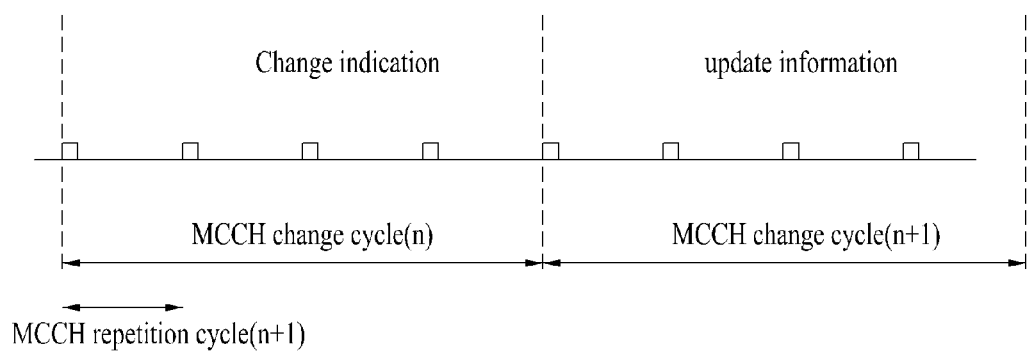
FIG. 7 is a diagram to describe an MCCH (MBMS control channel) information transmitting scheme.

A logical channel MCCH (MBMS control channel) or MTCH (MBMS traffic channel) for MBMS can be mapped to a transport channel MCH (MBMS channel). The MCCH carries an RRC message containing MBMS related common control information, while the MTCH carries a traffic of a specific MBMS service. A single MCCH exists in a single MBSFN (MBMS single frequency network) area to carry the same MBMS information or traffic. In case that a plurality of MBSFN areas are provided by a single cell, a user equipment may be able to receive a plurality of MCCHs. FIG. 7 shows a transmission scheme of MCCH information.

Referring to FIG. 7, if an MBMS related RRC message is changed in a specific MCCH, PDCCH transmits M-RNTI (MBMS-radio network temporary identity) and an MCCH indicator indicating a specific MCCH. A user equipment, which supports MBMS, receives the M-RNTI and the MCCH indicator via the PDCCH, recognizes that the MBMS related RRC message has been changed, and is then able to receive the specific MCCH. The RRC message of the MCCH can be changed each change cycle and is repeatedly broadcasted each repetitive cycle. FIG. 7 shows a transmission scheme of MCCH information.

Meanwhile, the MCCH transmits MBSFNAreaConfiguration message that indicates a ongoing MBMS session and a corresponding RB setting. And, the MCCH is able to transmit an MBMS counting request (MBMSCountingRequest) message for counting the number of user equipments in an RRC connected state, each of which receives or intends to receive at least one MBMS service.

A specific MBMS control information can be provided via BCCH. In particular, the specific MBMS control information can be contained in SystemInformationBlockType13 broadcasted via the BCCH.

As mentioned in the foregoing description, a network is able to count the number of user equipments, each of which receives or intends to receive a specific service, through a counting procedure. A counting procedure according to a related art is configured as follows. First of all, if a network sends an MBMS counting request message on DCCH (dedicated control channel), a user equipment sends back an MBMS counting response message.

Figure 8:
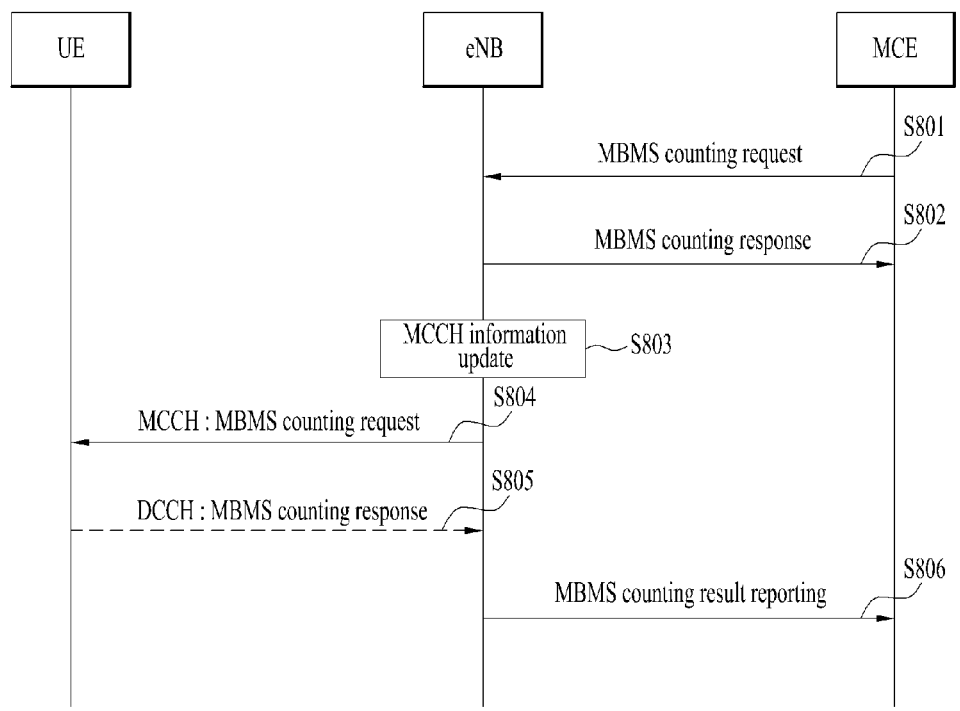
FIG. 8 is a flowchart of an MBMS counting process according to a related art.

FIG. 8 is a flowchart of an MBMS counting process according to a related art.

Referring to FIG. 8, a base station (eNB) starts a counting procedure in response to an MBMS counting request with MCE (multi-cell/multicast coordinated entity) and a corresponding MBMS counting response [S810, S802]. In this case, the MCE indicates an network entity that performs an admission control, a radio resources allocation, a session control signaling and the like. The base station (eNB) then updates MCCH information in accordance with the information contained in the MBMS counting request.

Subsequently, the base station (eNB) broadcasts an MBMS counting request message on MVVH channel [S804]. In this case, an MBMS ID list is contained in the counting request message. A user equipment, which monitors MCCH in MBSFN area, can receive the counting request message on the MCCH channel. If an ID of a service the user equipment intends to receive is contained in the counting request message, the user equipment sends a counting response message to the base station (eNB) on DCCH.

Finally, the base station (eNB) receives the counting response messages for the corresponding service from a plurality of user equipments, counts the number of the responding user equipments, and then informs the MCS of the MBMS counting result [S806].

According to the related art, if an MBMS counting procedure is initiated, a user equipment in RRC idle mode enters an RRC connected mode and then sends an MBMS counting response message to a base station. Hence, since the user equipment stays in the RRC connected mode, an overhead of controlling numerous user equipments in the RRC connected mode is present in viewpoint of the base station, i.e., a network.

According to the present invention, in order to efficiently use resources of a network, a user equipment intending to receive an MBMS configures an RRC connection to the network by sending an RRC connection request message including a specific indicator in UL and then receiving an RRC connection setup message in DL. If the specific indicator is contained in the RRC connection setup message, the user equipment sends an MBMS related UL message, i.e., an MBMS counting response message and then releases the configured RRC connection.

Preferably, the specific indicator may include a temporary connection indicator for an MBMS counting procedure. Hence, if the user equipments receives the temporary connection indicator, the user equipment sends the MBMS counting response message and then releases the RRC connection. If the user equipment does not receive the temporary connection indicator, the user equipment maintains the RRC connection after sending the MBMS counting response message.

Moreover, the specific indicator may indicate whether to allow the RRC idle mode user equipment to perform the MBMS counting procedure. Only if the specific indicator indicates that the RRC idle mode user equipment is allowed to perform the MBMS counting procedure, the RRC idle mode user equipment sends the RRC connection request message to the base station. On the contrary, if the specific indicator indicates that the RRC idle mode user equipment is not allowed to perform the MBMS counting procedure, the RRC idle mode user equipment does not send the RRC connection request message to the base station.

Furthermore, in case of receiving a counting prohibit time information of the MBMS related UL message, the user equipment intending to receive the MBMS may stop sending other MBMS related UL messages during a predetermined time in accordance with the prohibit time information.

Figure 9:
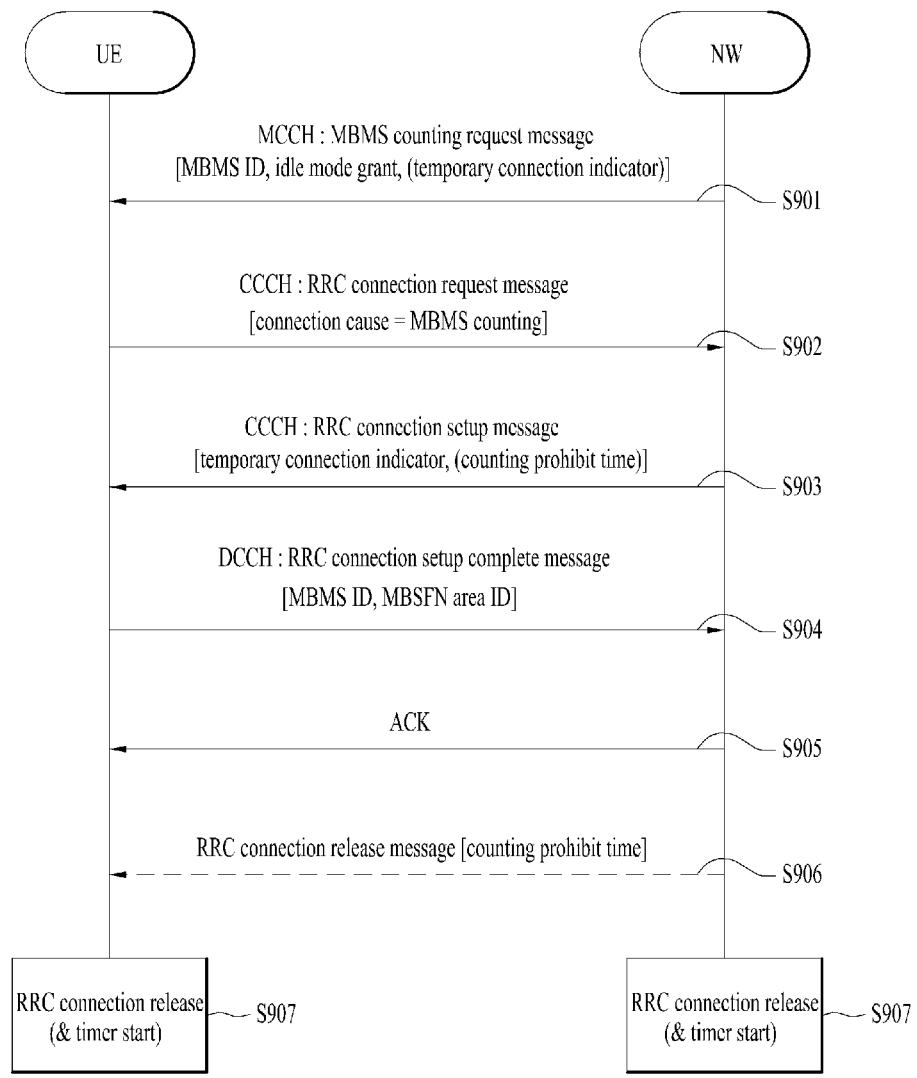
FIG. 9 is a diagram for one example of an MBMS counting process for an RRC idle mode user equipment according to an embodiment of the present invention.

FIG. 9 is a diagram for one example of an MBMS counting process for an RRC idle mode user equipment according to an embodiment of the present invention.

Referring to FIG. 9, a user equipment in an RRC idle mode can receive an MBMS counting request message for at least one MBMS from a network via MCCH [S901]. In this case, the MBMS counting request message may include an indicator indicating whether the RRC idle mode user equipment is allowed to perform an MBMS counting procedure and may also include a temporary connection indicator. Moreover, the at least one MBMS can be provided as a list.

After the user equipment has received the MBMS counting request message, if the user equipment is receiving the at least one MBMS in the list or desires to receive the at least one MBMS or the MBMS counting request message indicates that the RRC idle mode user equipment is allowed to perform the MBMS counting procedure, the user equipment can send an RRC connection request message to the network via CCCH [S902]. Particularly, it is preferable that an establishment cause inclusive in the RRC connection request message is set to one of 'MBMS counting', 'MBMS related procedure' and the like.

After the user equipment has received the MBMS counting request message including the temporary connection indicator, if the user equipment is receiving the at least one MBMS in the list or desires to receive the at least one MBMS, the user equipment can send an RRC connection request message having an establishment cause to 'MBMS counting' to the network via CCCH. In doing so, the user equipment does not perform an RRC connection establishment procedure but may be implicitly set to enter an RRC idle mode right after completion of the MBMS counting procedure.

Subsequently, after the network has received the RRC connection request message having the establishment cause set to 'MBMS counting', the network can send an RRC connection setup message via CCCH [S903]. The RRC connection setup message in the step S903 may include a temporary connection indicator instead of the former temporary connection indicator mentioned in the description of the step S901. In case that the user equipment receives the temporary connection indicator, the user equipment may be set to release the TTC connection after sending an MBMS counting response message.

Having received the RRC connection setup message, the user equipment can send an RRC connection setup complete message including at least one MBMS identifier, which is currently received or desired to be received, to the network on DCCH [S904]. Alternatively, after the RRC connection setup complete message has been sent, a separate MBMS counting response message can be sent. Of course, the separate MBMS counting response message may include the at least one MBMS identifier which is currently received or desired to be received. Moreover, the RRC connection setup complete message or the separate MBMS counting response message can include an MBSFN area identifier as well.

As mentioned in the foregoing description, the user equipment can receive the temporary connection indicator through one of the MBMS counting request message transmitted on MCCH, the RRC connection setup message and the system information block type 13 (SIB 13). At the timing point after sending the MBMS counting response message, receiving an ACK response to the RRC connection setup complete message [S905], or sending the RRC connection setup complete message including the at least one MBMS ID, the user equipment having received the temporary connection indicator can release the RRC connection [S907]. On the contrary, the user equipment failing in receiving the temporary connection indicator maintains the RRC connection. Namely, the user equipment does not release the RRC connection.

Alternatively, besides the method using the temporary connection indicator, in case that the user equipment initiates the RRC connection setup procedure for the MBMS counting procedure, the user equipment sends the MBMS counting response message and is then able to release the RRC connection. In particular, at the timing point after sending the MBMS counting response message, receiving an ACK response to the RRC connection setup complete message [S905], or sending the RRC connection setup complete message including the at least one MBMS ID, the user equipment can release the RRC connection [S907].

Of course, in case that the user equipment receives the RRC connection release message from the network [S905], the user equipment can release the RRC connection [S907].

Meanwhile, the network can enable information on a counting prohibit time to be included in one of the RRC connection setup message, the RRC connection release message and the SIB13. If the user equipment receives the information on the counting prohibit time, the user equipment can temporarily stop the transmission of another counting response message during the counting prohibit time.

In particular, if the user equipment releases the RRC connection or receives the information on the counting prohibit time, the user equipment can initiate a timer corresponding to the counting prohibit time [S907]. While the timer is operating, even if an MBMS received state or a reception desired state is changed in the user equipment, the user equipment does not send another counting response message to the network.

While the timer is operating, if an MBMS received state or a reception desired state is changed in the user equipment, if the user equipment receives another MBMS counting request message, the user equipment may be allowed to send a corresponding MBMS counting response message.

Of course, if the timer corresponding to the counting prohibit time expires, the user equipment can send an MBMS counting response message in response to the original MBMS counting request message as well as the MBMS counting response message in response to another MBMS counting request message.

Figure 10:
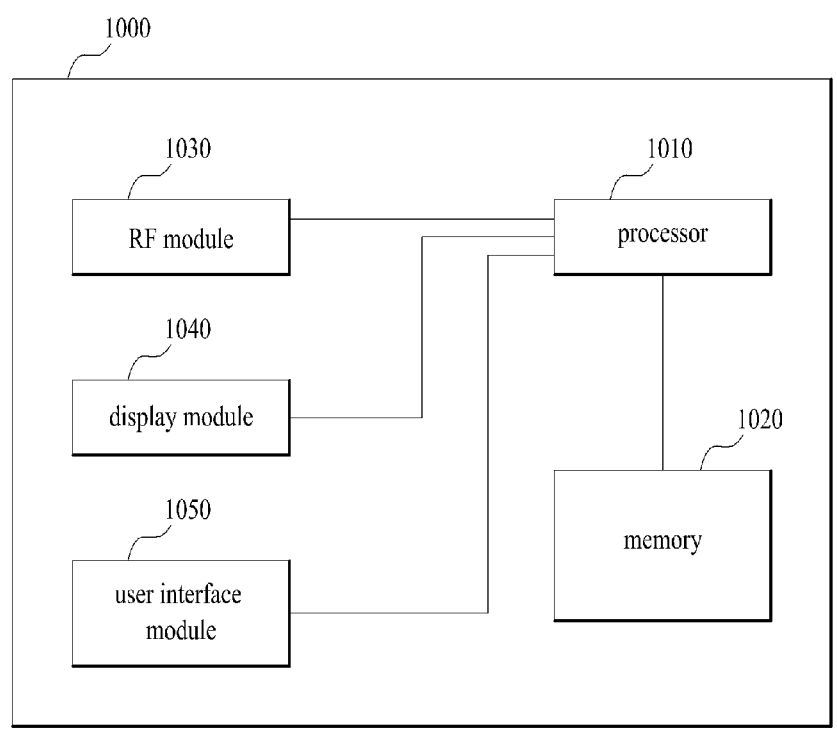
FIG. 10 is a block diagram for one example of a communication device according to one embodiment of the present invention.

FIG. 10 is a block diagram for one example of a communication device according to one embodiment of the present invention.

Referring to FIG. 10, a communication device 1000 includes a processor 1010, a memory 1020, an RF module 1030, a display module 1040 and a user interface module 1050.

The communication device 1000 is illustrated for clarity and convenience of the description and some modules can be omitted. Moreover, the communication device 1000 is able to further include at least one necessary module. And, some modules of the communication device 1000 can be further divided into sub-modules. The processor 1010 is configured to perform operations according to the embodiment of the present invention exemplarily described with reference to the accompanying drawings. In particular, the detailed operations of the processor 1010 can refer to the contents described with reference to FIGS. 1 to 9.

The memory 1020 is connected to the processor 1010 and stores an operating system, applications, program codes, data and the like. The RF module 1030 is connected to the processor 1010 and performs a function of converting a baseband signal to a radio signal or converting a radio signal to a baseband signal. For this, the RF module 1030 performs analog conversion, amplification, filtering and frequency uplink transform or inverse processes thereof. The display module 1040 is connected to the processor 1010 and displays various kinds of informations. The display module 1040 can include such a well-known element as LCD (Liquid Crystal Display), LED (Light Emitting Diode), OLED (Organic Light Emitting Diode) and the like, by which the present invention is non-limited. The user interface module 1050 is connected to the processor 1010 and can include a combination of well-known interfaces including a keypad, a touchscreen and the like.

The above described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of the appended claims or that those claims can be included as new claims by revision after filing an application.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a method of transceiving a message for a broadcast service reception in a wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method for transceiving a message with a network by a user equipment in a wireless communication system, the method comprising:
   receiving a multimedia broadcast multicast service (MBMS) counting request message from the network;
   transmitting, to the network, a connection request message including a connection cause of the connection request message;
   receiving, from the network, a connection setup message including information about a counting prohibit timer in response to the connection request message; and
   transmitting a connection setup complete message to the network in response to the MBMS counting request message after receiving the connection setup message;
   wherein, if the MBMS counting request message includes a temporary connection indicator, a connection with the network is released and the counting prohibit timer starts upon transmitting the connection setup complete message, and
   wherein the counting prohibit timer defines a duration to ignore the MBMS counting request message.

2. The method of claim 1, wherein the counting request message is received via MCCH (multicast control channel) or system information.

3. The method of claim 1, wherein the counting request message includes information on at least one service, and
   wherein the connection setup complete message includes a specific service, which is received or intended to be received by the user equipment, among the at least one service.

4. The method of claim 1, wherein the connection cause includes an MBMS counting.

5. A method for transceiving a message with a user equipment by a network in a wireless communication system, the method comprising:
   transmitting a multimedia broadcast multicast service (MBMS) counting request message to the user equipment;
   receiving a connection request message including a connection cause of the connection request message from the user equipment;
   transmitting a connection setup message including information about a counting prohibit timer to the user equipment in response to the connection request message; and
   receiving a connection setup complete message from the user equipment in response to the MBMS counting request message after transmitting the connection setup message,
   wherein, if the MBMS counting request message includes a temporary connection indicator, the user equipment releases a connection with the network and starts the counting prohibit timer upon transmitting the connection setup complete message to the network, and wherein the counting prohibit timer defines a duration to ignore the MBMS counting request message at the user equipment.

6. The method of claim 5, wherein the counting request message is sent via MCCH (multicast control channel) or system information.

7. The method of claim 5, wherein the counting request message includes information on at least one service, and wherein the connection setup complete message includes a specific service, which is received or intended to be received by the user equipment, among the at least one service.

8. The method of claim 5, wherein the connection cause includes an MBMS counting.

* * * * *